(12) United States Patent
Abrahamsen

(10) Patent No.: US 7,471,020 B2
(45) Date of Patent: Dec. 30, 2008

(54) LINEAR ACTUATOR

(75) Inventor: John Abrahamsen, Nordborg (DK)

(73) Assignee: Linak A/S, Nordborg (DK)

( * ) Notice: Subject to any disclaimer, the term of this patent is extended or adjusted under 35 U.S.C. 154(b) by 372 days.

(21) Appl. No.: 10/524,997

(22) PCT Filed: Aug. 20, 2003

(86) PCT No.: PCT/DK03/00551

§ 371 (c)(1),
(2), (4) Date: Feb. 18, 2005

(87) PCT Pub. No.: WO2004/018901

PCT Pub. Date: Mar. 4, 2004

(65) Prior Publication Data

US 2005/0264109 A1    Dec. 1, 2005

(30) Foreign Application Priority Data

Aug. 20, 2002  (DK) .............................. 2002 01229

(51) Int. Cl.
*H02K 41/00* (2006.01)
(52) U.S. Cl. ............................ 310/20; 74/25; 74/89.45; 310/80
(58) Field of Classification Search ............ 310/12, 310/20, 80; 74/424.93, 89.45, 403, 411, 74/25, 625; 303/116.2; 251/129.03; 318/2
See application file for complete search history.

(56) References Cited

U.S. PATENT DOCUMENTS

| | | | | |
|---|---|---|---|---|
| 2,541,529 A | | 2/1951 | McVicker | |
| 4,295,552 A | * | 10/1981 | Erlach | 192/81 C |
| 4,460,154 A | * | 7/1984 | Kunkle | 251/129.03 |
| 4,858,481 A | * | 8/1989 | Abraham | 74/89.38 |
| 5,269,031 A | | 12/1993 | Alexander | |
| 5,673,593 A | * | 10/1997 | Lafferty | 74/89.38 |
| 6,158,295 A | | 12/2000 | Nielsen | |
| 6,416,138 B1 | * | 7/2002 | Barnett | 303/116.2 |
| 2007/0169578 A1 | * | 7/2007 | Christensen et al. | 74/89.37 |

FOREIGN PATENT DOCUMENTS

| | | | |
|---|---|---|---|
| DE | 19532590 | * | 3/1997 |
| EP | 326831 | * | 8/1989 |

* cited by examiner

*Primary Examiner*—Burton Mullins
(74) *Attorney, Agent, or Firm*—Dykema Gossett PLLC

(57) ABSTRACT

A linear actuator, preferably for sickbeds and beds for domestic use, comprises a reversible electric motor (2) which, via a reduction gear, drives a spindle (4) with a nut (5) secured against rotation so that an activating element (6) connected with the nut is moved to and fro in response to the direction of rotation of the motor. In an emergency, the actuator may be driven manually with a hand crank, as a rear attachment, with which the actuator is secured, has a longitudinal opening in the longitudinal axis of the spindle, whereby the hand crank may be caused to engage the spindle. For this purpose, a shaft member is mounted in the rear attachment, said shaft member being engaged with the spindle and protruding rearwards from the rear attachment with one end. Control of the motor typically takes place via an H-bridge so that the motor does not short-circuit when the actuator is operated manually, it is ensured that the motor is not self-locking when the actuator is operated manually.

10 Claims, 2 Drawing Sheets

LINEAR ACTUATOR

BACKGROUND OF THE INVENTION

1. Field of the Invention

The present invention relates to a linear actuator comprising a cabinet, a reversible electric motor with a motor shaft, a reduction gear operatively connected with the motor shaft, a spindle operatively connected with the reduction gear, a spindle nut secured against rotation on the spindle, an activating element connected with the spindle nut and for attachment to the structure in which the actuator is to be incorporated, a rear attachment disposed in extension of the spindle opposite the activating element likewise for attachment of the actuator in the structure in which the actuator is to be incorporated.

2. The Prior Art

State of the art actuators are known e.g. from EP 531 247 A1, EP 586 326 A1, EP 647 799 and EP 662 573 A1 as well as WO 98/30816, all to Linak A/S. These actuators are used inter alia for incorporation in hospital beds and sickbeds. For an example of a hospital bed, reference may be made to EP 488 552 A1 to Huntleigh Technology plc. For hospital beds, the power supply is typically based on a transformer and a rectifier supplemented with a rechargeable battery pack, so that the bed may also be operated even though it is not connected to the mains, e.g. when it is driven from one location to another or during a temporary stay e.g. in an examination room or X-ray room. In emergency situations where the bed must be capable of quickly assuming a specific position, e.g. Trendelenburg's position, the actuators for hospital beds are provided with a disengagement device, where the spindle is disengaged from gear and motor so that e.g. the back and leg sections seek toward the horizontal by their own weight. The adjustment is then made manually by grasping the section and placing it in the desired position. The disengagement device may also be used in the event that the battery pack should fail, or another defect should occur. Where sickbeds and beds for domestic use are involved, equipment such as battery pack and disengagement device adds considerably to the costs. Instead of the rechargeable battery pack, an ordinary small 9V battery may be used, with the drawbacks this entails, and, moreover, it is frequently arranged at a location which is difficult to reach.

In bed structures having integrated spindles for adjustment of the bed, cf. e.g. U.S. Pat. No. 5,269,031 to Alexander, it is known to use a hand crank for manual adjustment of the bed in case of power failure, or altogether carry out the adjustment with a hand crank.

U.S. Pat. No. 2,541,529 to McVicker discloses a single example of an actuator where, under normal conditions, the spindle is driven by an electric motor via a worm gear, which, in emergency situations, can be driven by a hand crank, as the worm wheel is disengaged from the worm. The worm wheel is connected with the spindle via a specially configured, longitudinally slidable, spring-loaded coupling member. For introduction of the hand crank, a cap must first be screwed off, and then the hand crank is introduced and a cap with a bearing, mounted on the hand crank, is screwed on. The structure is bulky, as it requires a great mounting length as well as a large diameter, since the end of the hand crank must be capable of being introduced therein. In addition, the actuator has to be secured in another manner than by a rear attachment, as it must be possible to screw the caps off and on.

The object of the invention is to provide a state of the art actuator which may be operated manually by a hand crank without intervention in its basic structure, and which is additionally constructionally simple and inexpensive to manufacture.

SUMMARY OF THE INVENTION

This is achieved according to the invention by constructing the actuator such that its rear attachment has a longitudinal opening in the longitudinal axis of the spindle, so that the hand crank may be engaged with the spindle via this opening. The structure is simple and inexpensive and does not interfere with the basic configuration of the actuator.

A shaft member can be provided in the opening, with one end connected with one end of the spindle and configured at its other end for operative reception of the end of the hand crank, it being desired to avoid introducing the end of a hand crank deep into the interior of the actuator.

The shaft member can be formed by an extension of the spindle, which then preferably protrudes from the end of the rear attachment.

The shaft member can be a separate element mounted in the rear attachment. This is easier in terms of mounting, since the rear attachment may then be made as a unit with integrated shaft member. It also provides the option of preparing the actuator for optional mounting of rear attachment with or without a facility for manual operation.

The shaft member may be secured to the end of the spindle with a cylindrical object and the connection can be particularly simple in that the cylindrical object has an end bottom with a hole at the end of the spindle, and this can be shaped as a rivet head for retaining the cylindrical object. The shaft member may be connected with the cylindrical object in a simple manner by a pin.

The opening may have various geometrical cross-sections, but a circular cross-section and a shaft member likewise of circular cross-section have evident advantages in terms of mounting and sealing.

Where the rear attachment is a separate object mounted at the end of the cabinet, the actuator may be made impervious to moisture and water by a seal between the rear attachment and the cabinet as well as one between the shaft member and the opening. Where the rear attachment is split about a longitudinal central plane, the two seals may be formed as two integrated halves and be applied to the rear attachment, which facilitates the application and the correct positioning of the seals.

An H-bridge in the electrical control of the actuator comprises at least a diode so that the motor is not short-circuited when the actuator is operated manually with the hand crank. It is hereby easy to operate the actuator manually, since it is not necessary to overcome the self-locking ability of the motor because of short-circuiting of it. The drawback is then that the motor no longer contributes to the self-locking ability of the actuator, but this may be compensated for in another manner, if necessary, e.g., by spindles with a greater self-locking ability or brakes. Another drawback is also that the energy, which is otherwise dissipated in the motor by short-circuiting of it, now has to be dissipated in another manner. This, however, has been found to have a positive influence on the deceleration that becomes softer, which is felt more comfortable by the user. Previously, there have been extra means for overcoming a too hard deceleration. The structure has also been found to have a favourable influence on the service life of the relays of the H-bridge, which can otherwise be a problem. As a result of the diode, the relay is not left energized when it is switched off, in contrast to a short-circuit of the motor where this acts as a generator and applies a very high voltage to the contact points of the relay.

An embodiment of the invention will be described more fully below with reference to the accompanying drawings.

DETAILED DESCRIPTION OF THE PREFERRED EMBODIMENTS

Figure 1:
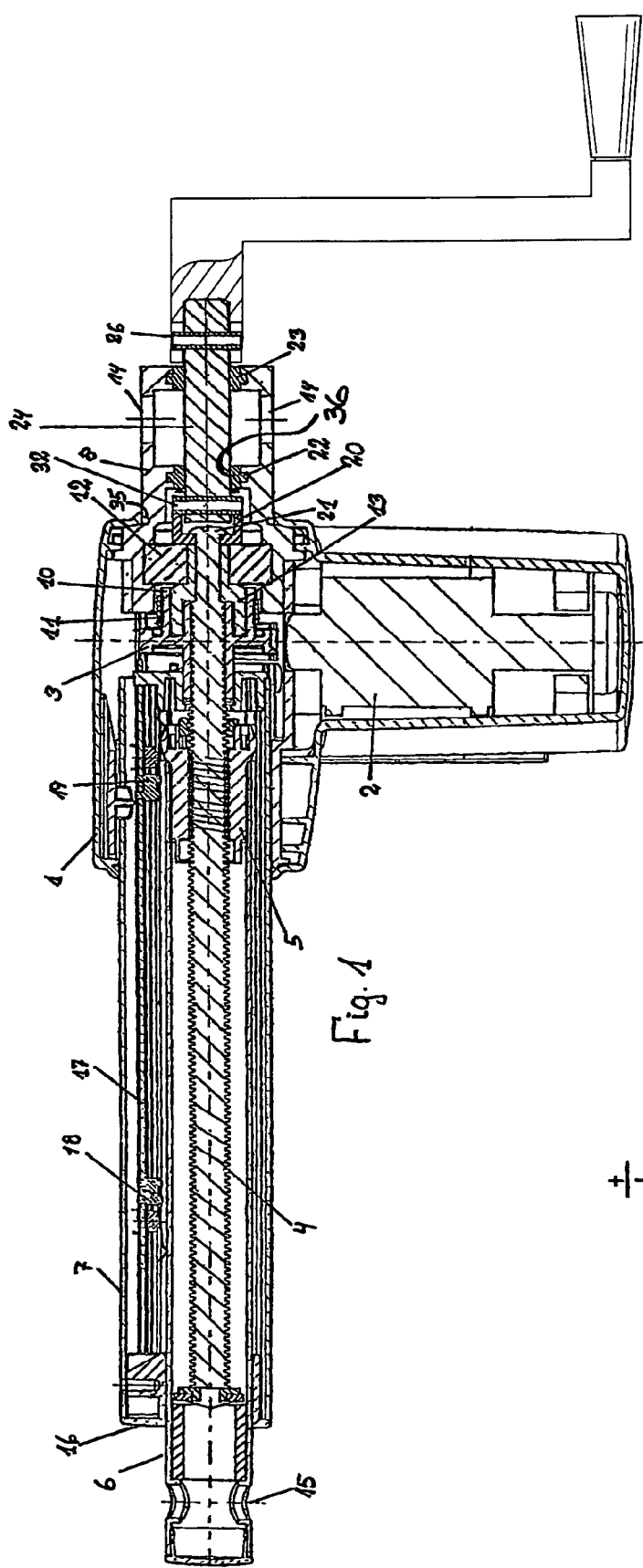
FIG. 1 is a longitudinal section through the actuator.

As will appear from the drawings, the main components of the actuator are a cabinet 1, a reversible electric motor 2, typically a 24V or 48V DC motor, a worm gear with a worm wheel 3, a spindle 4, a spindle nut 5, an activating element 6, also called the inner pipe, an outer pipe 7 and a rear attachment 8. The actuator is generally constructed as described in the applicant's international application WO 02/29284, which is hereby incorporated by reference.

The worm wheel 3 is secured on the rear end of the spindle 4 and is in engagement with a worm configured as an extended part of the motor shaft. The worm wheel 3 is provided with a cylindrical element 10 on one side, on which a screw spring 11 is seated for increasing the self-locking ability of the spindle, as described more fully in EP 662 573 B1. One end of the screw spring is bent radially outwards and is secured in a metal insert. Next is a ball bearing 12 on a metal insert 13 with a part which is accommodated in a hollow in the cylindrical element 11 of the worm wheel, which are connected with each other by a splined connection.

The ball bearing 12 is mounted in a recess in the rear attachment 8 consisting of two halves. The rear attachment 8 has an eye 14 at each side for attachment of the actuator in the structure in which it is to be incorporated.

The activating rod 6 is formed by a pipe and is secured with its rear end to the spindle nut 5. The outer end of the rod is closed by a tightly fitting plastics plug. The rod is secured by means of an eye 15 to the structure in which the actuator is to be incorporated. The eye has a bearing face provided in that its hole rim is turned up into the hollow of the rod.

The outer pipe 7 is formed by an extruded aluminium pipe of non-circular cross-section. The outer end of the pipe accommodates an end cover 16 having a circular hole as a guide for the activating rod 6. The outer pipe is received with its rear end as a snug fit in a portion at the front end of a bracket secured to the motor housing, for further detail see WO 02/29284.

The outer pipe 7 internally has grooves for retaining the spindle nut 5 against rotation, said nut having corresponding external bosses on a collar which engage the grooves. The pipe additionally has two grooves opposite each other for insertion of a strip-shaped printed circuit board 17 carrying, at each end, an end stop contact 18, 19 which is activated by a spring arm mounted on a bracket in connection with the contact. When the spindle nut reaches an end position, it will press the spring arm against the contact, which is then activated and stops the motor via the control.

In case of power failure, the actuator may be operated by a hand crank at the rear attachment 8 of the actuator. The end of the spindle has secured thereto a cylindrical object 20 with an end bottom, which is formed with a hole for the end of the spindle which is configured into a rivet head 21. The cylindrical object has such a large diameter that it retains the bearing 12 on the spindle. The rear attachment 8 accommodates two slide bearings 22, 23 for a shaft member 24, whose one end is passed into the cylindrical object and secured to it by a cotter pin (not shown) through aligned holes in the pipe object 20 and the shaft member 24. At the other end of the shaft member 24, a through cotter pin 26 is secured in a hole for cooperation with a slot in the hand crank.

Figure 2:
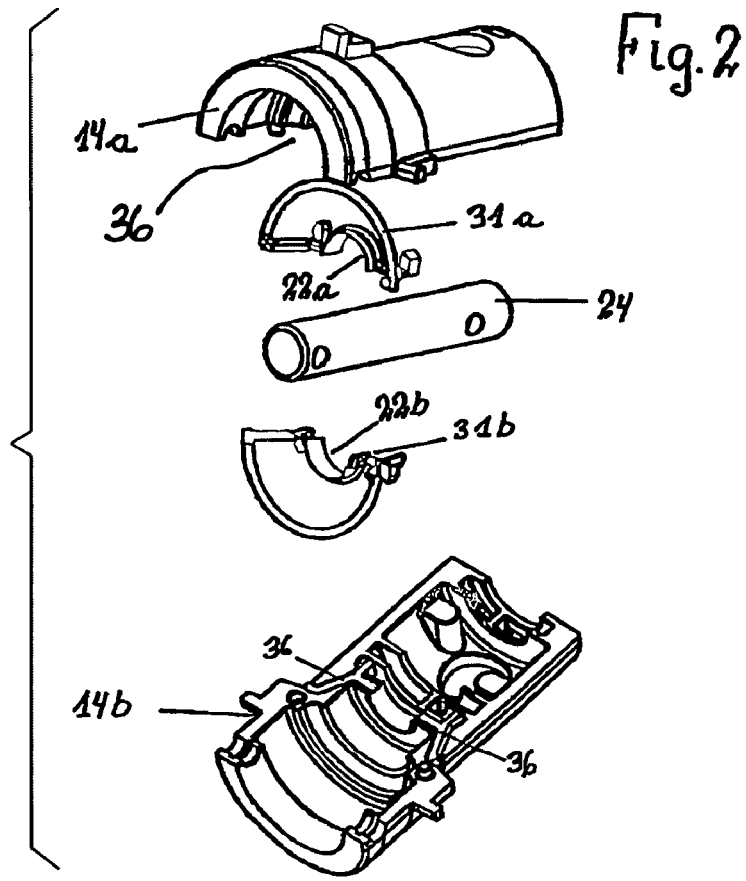
FIG. 2 is an exploded view of a rear attachment with shaft member and seal.
Figure 3:
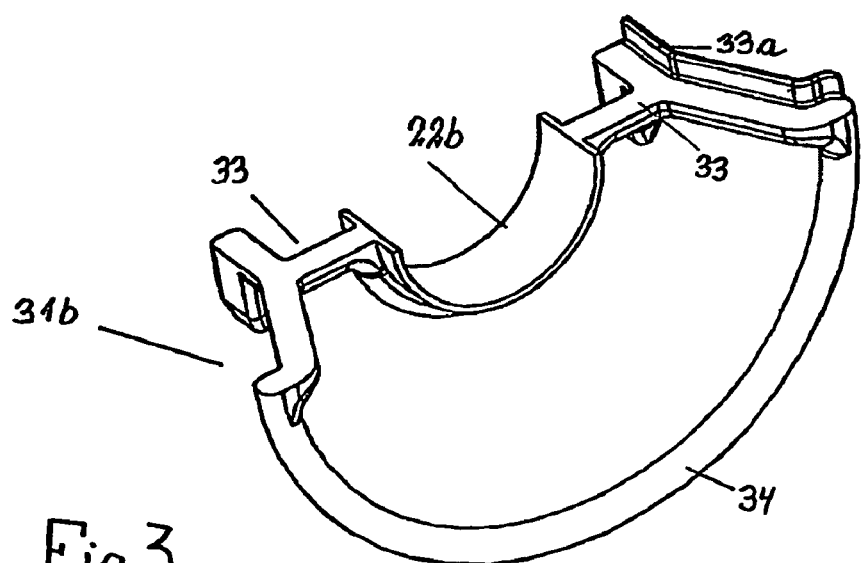
FIG. 3 is a perspective close-up of a seal.

FIG. 2 of the drawing shows an exploded view of the rear attachment which consists of two halves 14*a*, 14*b*, and also the shaft member 24 is shown together with two seal halves 31*a*, 31*b*, of which a larger picture of the lower seal half is shown in FIG. 3. The slide bearing 22 also acts as a seal and is moved slightly outside the side wall for noise damping of the pin 32. The seal 22 is connected by the structure 33 with the seal 34 which is disposed in the groove 35 on the outer side of the rear attachment and seals against the cabinet. The structure 33 is received in a recess 36 in the joint face on the rear attachment. One side of the structure 33 has a side wall 33*a* which, in the recess (longitudinal opening) 36, extends down on the outer side of the overlying structure, it being noted that the two seal halves are identical. This provides a good and safe seal of the shaft member as well as of the rear attachment as a whole. The seal is moreover easy to mount.

Figure 4:
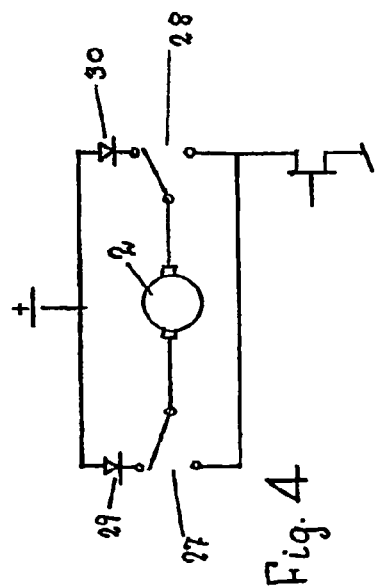
FIG. 4 is a diagram of an H-bridge for the electrical control of the motor of the actuator.

The control of the electric motor is based on an H-bridge which, as shown in FIG. 4, comprises two relays 27, 28 for switching off the power to the motor and for reversing the direction of the current for reversing the direction of rotation of the motor. The relays are controlled via a manual control or by a control panel as well as by the end stop contacts 18, 19. Two diodes 29, 30 are inserted into the H-bridge which block the countervoltage generated in the electric motor when the power to the motor is switched off. Thus, the motor does not contribute to the self-locking ability of the actuator, and it is hereby easier to operate the actuator manually with the hand crank. The embodiment with the diodes additionally has the advantages mentioned in the preamble.

When the hand crank is operated, the spindle 4 is rotated, thereby displacing the spindle nut 5 and the activating rod 6 connected with it, as if the actuator were driven by the motor. It is noted that the worm wheel 3 is rotated by the spindle 4 and causes the motor to rotate via the worm.

The invention thus provides a compact actuator which may be operated by a hand crank, and which also provides additional advantages in usual operation, such as soft deceleration and longer service life of the relays in the H-bridge. In the present context, hand cranks are taken to mean mechanical hand cranks as well as battery-driven devices having an adapter for insertion over the end of the shaft member 24.

The invention claimed is:

1. A linear actuator comprising a cabinet, a reversible electric motor with a motor shaft; a reduction gear operatively connected with the motor shaft; a spindle operatively connected with the reduction gear; a spindle nut secured against rotation on the spindle; an activating element connected with the spindle nut and for attachment to a structure in which the actuator is to be incorporated; a rear attachment disposed in extension of the spindle opposite the activating element likewise for attachment of the actuator in the structure in which the actuator is to be incorporated, the rear attachment having a longitudinal opening in the longitudinal axis of the spindle; and a shaft member provided in the opening as a separate element, said shaft member being connected at one end thereof with one end of the spindle and configured at its other end for operative reception of the end of a hand crank.

2. The actuator according claim 1, wherein the shaft member is formed by an extension of the spindle.

3. The actuator according to claim 1, wherein the shaft member is secured to the end of the spindle with a cylindrical object.

4. The actuator according to claim 3, wherein the cylindrical object has an end bottom with a hole at the end of the spindle, and that this is shaped as a rivet head for retaining the cylindrical object.

5. The actuator according to claim 4, wherein the shaft member is connected with the cylindrical object by a pin.

6. The actuator according to claim 1, wherein the opening has a circular cross-section, and that the shaft member likewise has a circular cross-section.

7. The actuator according to claim 1, including a power supply with a connection to mains voltage and an outlet with a reduced voltage for connection to the motor, an electrical control comprising an H-bridge with two relays for switching power to the motor on and off and for reversing current direction for reversing rotational direction of the motor, and wherein the H-bridge comprises at least a diode so that the motor is not short-circuited when the actuator is operated manually with the hand crank.

8. The actuator according to claim 7, wherein the H-bridge comprises a further diode so that the motor is not short-circuited when the actuator is operated manually with the hand crank for running toward another end portion.

9. A linear actuator comprising a cabinet, a reversible electric motor with a motor shaft; a reduction gear operatively connected with the motor shaft; a spindle operatively connected with the reduction gear; a spindle nut secured against rotation on the spindle; an activating element connected with the spindle nut and for attachment to a structure in which the actuator is to be incorporated; a separate rear attachment mounted at the end of the cabinet with a first seal and disposed in extension of the spindle opposite the activating element likewise for attachment of the actuator in the structure in which the actuator is to be incorporated, the rear attachment having a longitudinal opening in the longitudinal axis of the spindle; and a shaft member provided in the opening for engagement of a hand crank for manual operation of the spindle, said shaft member including a second seal.

10. The actuator according to claim 9, wherein the rear attachment is split about a longitudinal central plane, and the first and second seals are formed as two integrated halves.

* * * * *